(12) United States Patent
Midkiff

(10) Patent No.: US 8,791,818 B2
(45) Date of Patent: Jul. 29, 2014

(54) VIRTUAL WATCH

(76) Inventor: James Midkiff, San Angelo, TX (US)

( * ) Notice: Subject to any disclaimer, the term of this patent is extended or adjusted under 35 U.S.C. 154(b) by 382 days.

(21) Appl. No.: 12/621,309

(22) Filed: Nov. 18, 2009

(65) Prior Publication Data
US 2010/0123579 A1  May 20, 2010

Related U.S. Application Data

(60) Provisional application No. 61/115,826, filed on Nov. 18, 2008.

(51) Int. Cl.
| | | |
|---|---|---|
| G08B 29/00 | (2006.01) | |
| G08B 23/00 | (2006.01) | |
| G08B 1/00 | (2006.01) | |
| G08B 1/08 | (2006.01) | |
| G08B 25/00 | (2006.01) | |
| H04M 11/04 | (2006.01) | |
| G08B 13/196 | (2006.01) | |
| H04N 7/18 | (2006.01) | |

(52) U.S. Cl.
CPC .......... *H04N 7/181* (2013.01); *G08B 13/19652* (2013.01); *G08B 13/19693* (2013.01); *G08B 13/19656* (2013.01); *G08B 13/19695* (2013.01); *G08B 13/19697* (2013.01); *H04N 7/188* (2013.01)
USPC ........... 340/541; 340/506; 340/517; 340/531; 340/539.25; 340/524; 340/533

(58) Field of Classification Search
USPC ............... 340/541, 506, 531, 539.25, 517
See application file for complete search history.

(56) References Cited

U.S. PATENT DOCUMENTS

| | | | |
|---|---|---|---|
| 6,433,690 B2 | 8/2002 | Petelenz et al. | |
| 6,975,220 B1 * | 12/2005 | Foodman et al. | 340/531 |
| 7,126,454 B2 | 10/2006 | Bulmer | |
| 7,187,418 B2 | 3/2007 | Phillips et al. | |
| 7,382,244 B1 * | 6/2008 | Donovan et al. | 340/506 |

(Continued)

OTHER PUBLICATIONS

Author: Al-Deek et al.; Title: The Central Florida Data Warehouse (CFDW) Phase 2; Date: Jun. 2004; Pertinent Pages: Entire Document.*

(Continued)

*Primary Examiner* — Steven Lim
*Assistant Examiner* — Muhammad Adnan
(74) *Attorney, Agent, or Firm* — Dentons US LLP

(57) ABSTRACT

Embodiments of the disclosed invention include a system and a method for monitoring a location. For example, the disclosed embodiments may be utilized to monitor a border, such as, but not limited to, the border between the United States and Mexico. In addition, the disclosed embodiments may be utilized to monitor any location including, but not limited to, residential locations, businesses, warehouses, and mass transportation facilities. In one embodiment, a web portal is provided in which the general public may view streaming video and/or still images associated with cameras placed along the monitored location. A user viewing one or more selected cameras is provided with an option to report suspicious activities seen on the one or more selected cameras. The report is sent to one or more local law enforcement agencies associated with the location of the camera.

27 Claims, 15 Drawing Sheets

(56) References Cited

U.S. PATENT DOCUMENTS

| | | | |
|---|---|---|---|
| 7,746,794 B2* | 6/2010 | Sink | 370/245 |
| 7,944,357 B2* | 5/2011 | Hodges | 340/573.1 |
| 2002/0138847 A1* | 9/2002 | Abrams et al. | 725/105 |
| 2004/0190767 A1* | 9/2004 | Tedesco et al. | 382/156 |
| 2005/0038741 A1 | 2/2005 | Bonalle et al. | |
| 2005/0120127 A1 | 6/2005 | Bradley et al. | |
| 2005/0190061 A1* | 9/2005 | Trela | 340/573.1 |
| 2008/0303693 A1* | 12/2008 | Link, II | 340/905 |
| 2011/0141277 A1* | 6/2011 | Midkiff | 348/143 |

OTHER PUBLICATIONS

International Search Report and Written Opinion date mailed Feb. 24, 2010; PCT International Application No. PCT/US2009/068532.

* cited by examiner

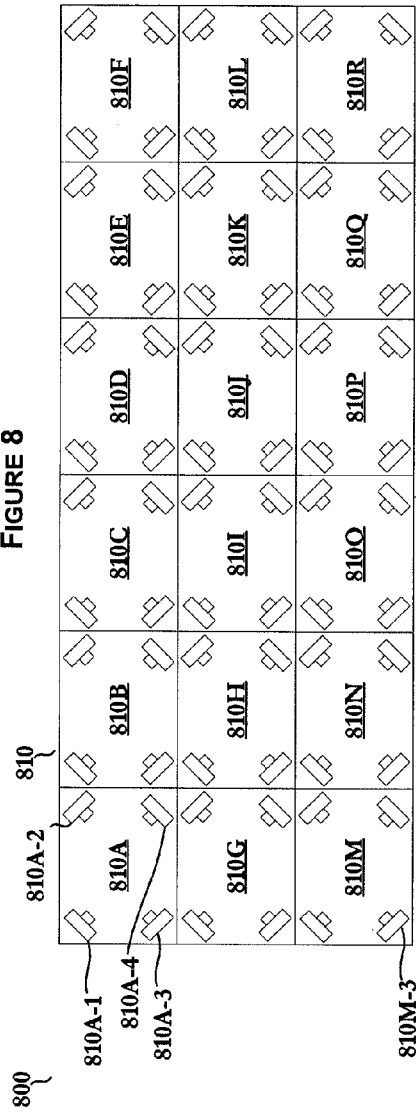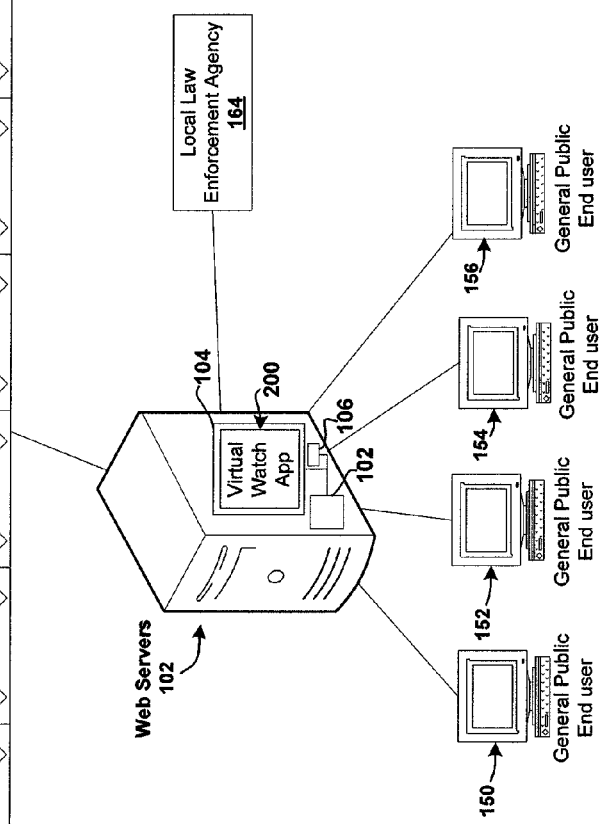
FIGURE 8

FIGURE 10

USER SELECTION SCREEN 1000

SELECT ONE OR MORE LOCATIONS TO MONITOR

| | 1002 | 1004 | 1006 |
|---|---|---|---|
| ○ | COMPANY A | [Pay Terms] | [Preview Image] |
| ● | COMPANY B | [Pay Terms] | [Preview Image] |
| ○ | COMPANY C | [Pay Terms] | [Preview Image] |
| ○ | COMPANY D | [Pay Terms] | [Preview Image] |
| ● | COMPANY E | [Pay Terms] | [Preview Image] |
| ○ | COMPANY F | [Pay Terms] | [Preview Image] |

[View Images From Selected Locations]

VIRTUAL WATCH

CROSS REFERENCE TO RELATED APPLICATION

This Application claims priority to U.S. Provisional Patent Application Ser. No. 61/115,826 filed on Nov. 18, 2008, the entire contents of which are hereby incorporated by reference.

BACKGROUND OF THE INVENTION

The Texas Border Sheriff's Coalition (TBSC) is comprised of Sheriffs from counties along the Texas-Mexico border. The Texas Border Sheriff's Coalition is committed, from a national security perspective, to protect lives, property, and the rights of the people, maintain order and security in the United States along the Republic of Mexico border, enforce the law impartially, and provide police service in partnership with other law enforcement agencies and community partners.

The law enforcement officers of other states and members of various agencies of the United States and other countries also have a strong interest in policing their borders, whether for reasons of terrorism, national security, or immigration control. In one sense, the border defines a community. Other "communities" such as neighborhoods, businesses, government installations, shipyards, warehouses, and even individual residences may benefit from protection and monitoring.

BRIEF SUMMARY OF THE INVENTION

Embodiments of the disclosed invention include a system and a method for monitoring a particular location. For example, the disclosed embodiments may be utilized to monitor a border, such as, but not limited to, the border between the United States and Mexico. In addition, the disclosed embodiments may be utilized to monitor any location including, but not limited to, residential locations, businesses, warehouses, and mass transportation facilities. In one embodiment, a web portal is provided in which the general public may view streaming video and/or still images associated with cameras placed along the monitored location. A user viewing one or more selected cameras is provided with an option to report suspicious activities seen on the one or more selected cameras. The report is sent to one or more local law enforcement agencies associated with the location of the camera.

BRIEF DESCRIPTION OF THE DRAWINGS

For a more complete understanding of the present application, the objects and advantages thereof, reference is now made to the following descriptions taken in conjunction with the accompanying drawings, in which:

FIG. 8 depicts a network environment in which the virtual watch application of FIG. 2 may be utilized to monitor a shipping yard in accordance with an illustrative embodiment;

FIG. 10 depicts an embodiment of a user selection screen for enabling a general public user to select a monitored location in accordance with the illustrative embodiments;

DETAILED DESCRIPTION OF THE INVENTION

The disclosed embodiments and advantages thereof are best understood by referring to FIGS. 1-15 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

The disclosed embodiments recognize the advantages of getting the public involve in fighting crime. For instance, certain of the disclosed embodiments seek to deploy a Virtual Community Watch by creating an innovative real-time surveillance program designed to empower the public to proactively participate in fighting border crime. For instance, in one embodiment, a network of cameras and sensors along the Texas-Mexico border feeds live streaming video to a server. A website is created that enables a general public user to monitor the images and report suspicious activity.

In other embodiments of the disclosed embodiments, a general public user may be incentivize, either financially and/or via other means, to monitor a location and report suspicious activity. For instance, a neighborhood and/or a business may utilize a Virtual Community Watch to protect against crime. The Virtual Community Watch may consist of people in the neighborhood and/or any general public user that desires to assist in protecting against crime. In certain embodiments, the physical location of a monitored location is unknown to a person monitoring the images of the location to guard against misuse of the disclosed embodiments.

Figure 1:
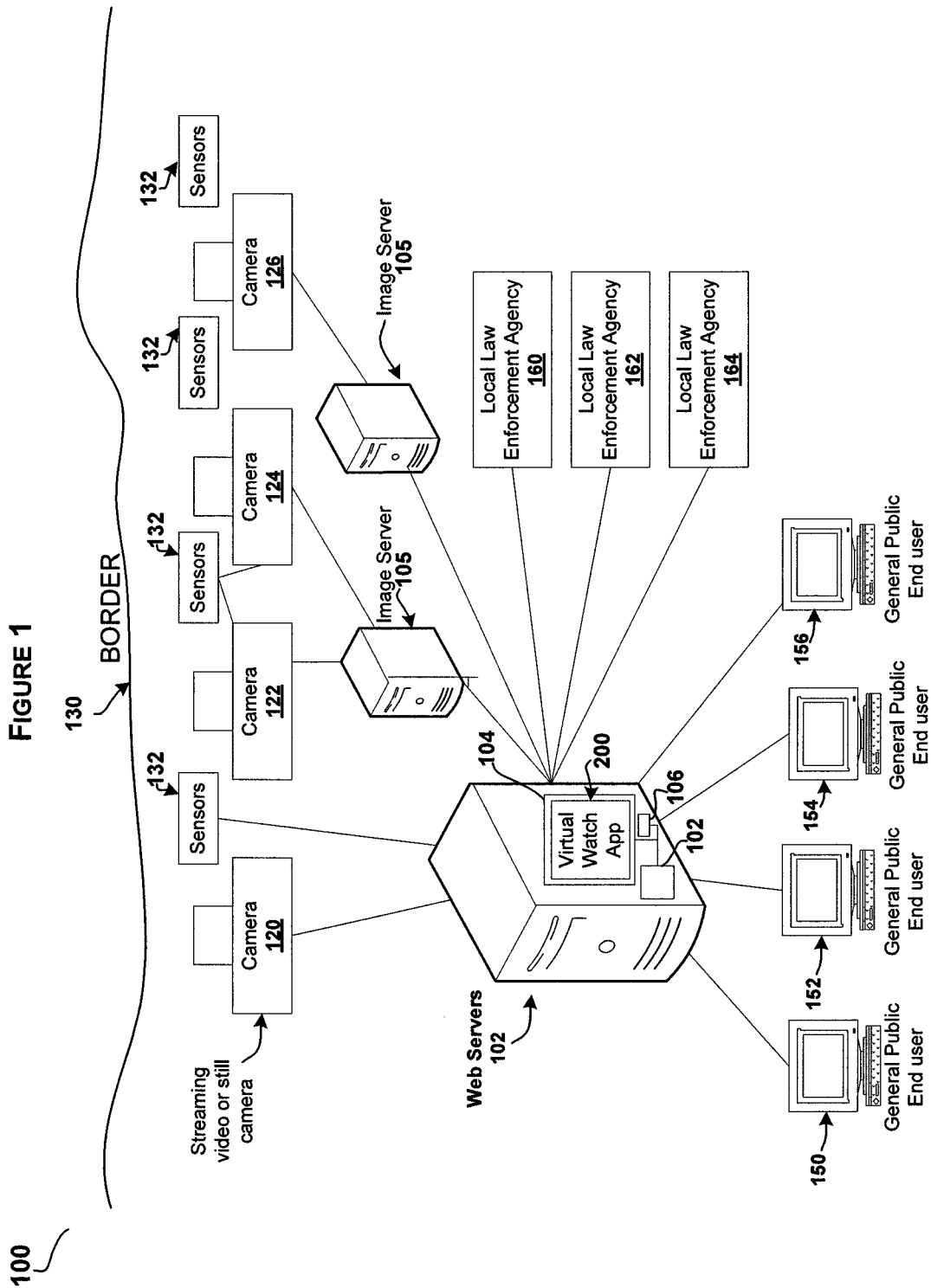
FIG. 1 depicts an embodiment of a network environment in which the illustrative embodiments may be implemented.

With reference now to the figures, FIG. 1 depicts a network environment 100 in which the illustrative embodiments may be implemented for providing surveillance to a particular location. In the depicted embodiment, servers 102 executes a virtual watch application 200 to enable the general public to view streaming video and/or still images over the Internet from a plurality of image capturing devices, such as, but not limited to, cameras 120, 122, 124, and 126 placed at and/or along a location 130. In one embodiment, location 130 may represent a territorial border between a first country and a second country, such as, but not limited to, the United States and Mexico.

Servers 102 include one or more data processing systems that provide data and computer executable instructions for enabling a user to view images from a plurality of image capturing devices and report suspicious activity seen on the plurality of image capturing devices. For instance, users 150, 152, 154, and 156 may log onto a website hosted by servers 102 via a web browser executed on, but not limited to, a personal computer. In certain embodiments, users 150, 152, 154, and 156 may be anyone in the general public that desires to view images from the plurality of image capturing devices. In one embodiment, servers 102 utilize computer executable program code associated with virtual watch application 200 to communicate and retrieve images from cameras 120, 122, 124, and 126 via an image server 105. Image server 105 is a type of server that specializes in delivering images and streaming media. In some embodiments, servers 102 communicate directly with cameras 120, 122, 124, and/or 126. For example, in one embodiment, a different server 102 may be associated with each individual camera. Additionally, in some embodiments, the features and functions provided by virtual watch application 200 may be executed by a single data processing system or may be provided by additional data processing systems/server components not described or depicted in FIG. 1.

In certain embodiments, virtual watch application 200 may comprise computer executable code program code to enable a group of users, such as, but not limited to, users 150, 152, 154, and 156, to form a virtual stakeout team. For example, in one embodiment, members of a virtual stakeout team may monitor one or more cameras and communicate to each other via instant messaging, email, blogging, and/or any other communication format. In certain embodiments, the communication means (e.g., instant messaging, blogging, etc.) may be provided as part of the user interface that enables users to view the images from the plurality of image capturing devices. In other embodiments, virtual watch application 200 may utilize a separate application for enabling the members of a virtual stakeout team to communicate.

Additionally, in some embodiments, one or more sensors 132 may be placed about location 130 to provide additional surveillance and/or information associated with the monitored area. For example, in some embodiments, sensors 132 may be, but are not limited to, motion sensors and/or radar sensors for detecting movement, heat sensors for detecting body heat, sound sensors for detecting sound, and/or pressure sensors for detecting a person or thing within the area. In some embodiments, sensors 132 may be remotely controlled from a distance and/or controlled over a network. In certain embodiments, sensors 132 may directly communicate with servers 102 via a wired or wireless connection. Additionally, in some embodiments, sensors 132 may be communicatively coupled to one or more image capturing devices, such as, but not limited to, camera 122 and 124. In addition, in some embodiments, sensors 132 may trigger events to occur, such as, but not limited to, moving a particular camera to focus on a particular area, and/or begin recording images associated with particular camera, and/or transmit an alert to a specified person and/or location. In certain embodiments, one or more users may be able to simultaneously watch and/or control one or more sensors 132 and/or cameras over the network. For instance, in some embodiments, a user may control the direction, angle, and the zoom function of one or more cameras, such as, but not limited to, camera 122.

In one embodiment, virtual watch application 200 enables the general public to report suspicious activities seen on the one or more cameras by clicking a report button on the user interface of the website. In some embodiments, virtual watch application 200 determines one or more local law enforcement agencies, such as, but not limited to, local law enforcement agencies 160, 162, and 164, associated with a reporting area of a reported camera. A reported camera is a camera that captures images that a user reports as containing suspicious activity. In one embodiment, virtual watch application may perform a database lookup to determine the local law enforcement agencies associated with a particular camera. For instance, local law enforcement agency 160 may be a local sheriff/police department, local law enforcement agency 162 may be a border patrol unit and/or a border sheriffs coalition, and local law-enforcement agency 164 may be a federal drug enforcement agency. Additionally, in some embodiments, the images/video from cameras 120, 122, 124, and 126 are recorded and archived in a database and may be retrieved by local law enforcement agencies 160, 162, and 164.

Figure 2:
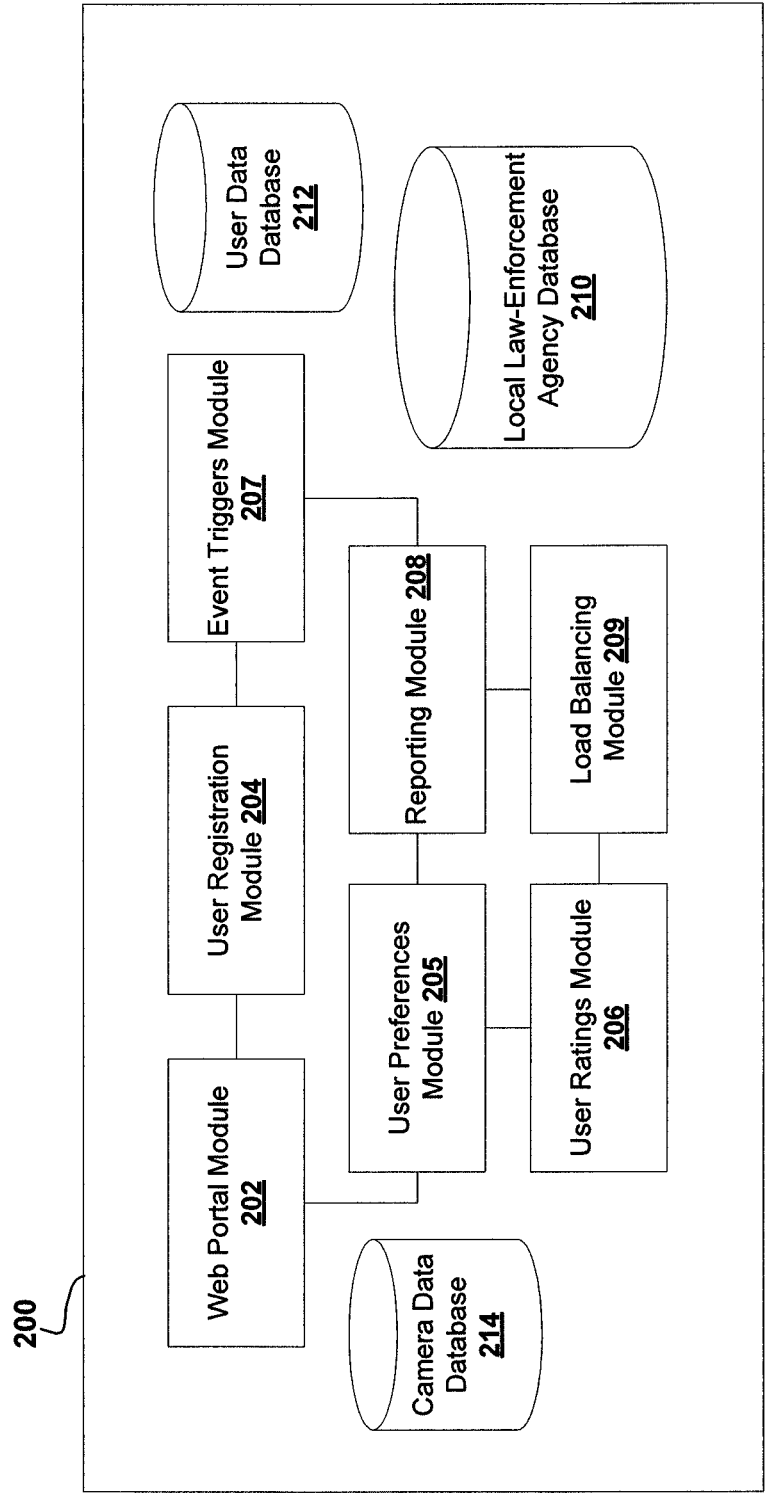
FIG. 2 depicts an embodiment of a virtual watch application in accordance with the illustrative embodiments.

FIG. 2 depicts an embodiment of virtual watch application 200 in accordance with the illustrative embodiments. In the depicted embodiment, virtual watch application 200 includes, among other components, a web portal module 202, a user registration module 204, a user ratings module 206, and a reporting module 208. In other embodiments, virtual watch application 200 may include additional modules, and/or may combine/delete one or more of the disclosed modules, and/or may comprise of different modules that perform the same or similar functions as described below. Each of the modules comprises computer executable instruction code that may be stored in a computer readable medium 104, such as, but not limited to, random access memory, a hard disc drive, flash memory, and/or an external data storage medium. The computer executable instruction code in each module may be executed by one or more data processing systems using one or more processors 102. The one or more data processing systems each include a network communication interface 106 for enabling data to be communicated over a network to one or more remote devices/systems.

In one embodiment, web portal module 202 comprises computer executable instruction code for generating the user interface, i.e., a website, to enable the general public to view the still images and/or the streaming video associated with cameras 120, 122, 124, and 126 placed along location 130. In addition, web portal module 202 includes computer executable program code for calling the appropriate functions and/or classes for enabling a user to generate a report of suspicious activity to one or more local law-enforcement agencies. Additionally, in some embodiments, web portal module 202 may include computer executable instruction code for enabling general public users 150, 152, 154, and 156 to submit comments and/or suggestions for improving the website.

User registration module 204 comprises computer executable program code for registering a general public user. For example, in some embodiments, a user must create a username and password to gain access to the web portal. In some embodiments, the user must also provide a valid e-mail address. Additionally, in some embodiments, prior to and/or in conjunction with submitting a suspicious activity report, a user must provide some form of contact information, such as, but not limited to, a phone number and/or physical address. The provided information may be used to enable a local law-enforcement agency responding to the suspicious activity report to contact the reporting user to gather additional information. In some embodiments, virtual watch application 200 stores the user data in a database, such as, but not limited to, user data database 212.

In addition, in some embodiments, virtual watch application 200 may include a user preferences module 205. User preferences module 205 comprises computer executable program code for enabling a user to specify/configure one or more user preferences. For example, in one embodiment, user preferences module 205 may include computer executable instruction code for enabling a user to configure a notification feature to notify a user of detected and/or potential events associated with one or more of the monitoring devices. In certain embodiments, a user may specify one or more geographical regions of interest associated with location 130. For example, if location 130 is the Texas/Mexico border, a user may configure virtual watch application 200 to provide notification for events occurring near West Texas and not for events occurring near South Texas. Further, in some embodiments, a user may indicate a method and/or format for receiving the notification. For instance, in some embodiments, a user may provide an email address and/or a phone number to which a notification message may be sent. A user may indicate one or more modes of communication, such as, but not limited to, email, SMS text, MMS picture, and recorded video/audio. In other embodiments, a user may request that live streaming video be sent to a particular user's device. The user may further indicate a particular video format, such as, but not limited to, Windows® Media Format, Adobe Flash®, and/or Apple QuickTime®.

User ratings module 206 comprises computer executable program code for enabling other users and/or law-enforcement agencies to rate a user's reliability based on past reported suspicious activities. Thus, in some embodiments, virtual watch application 200 may provide a priority and/or rating associated with a suspicious activity report based on past reports generated by the same user. For example, if a particular user is known as a reliable source, virtual watch application 200 may attach a high alert priority to reports generated by this user. In some embodiments, the user ratings may be used to provide rewards, such as, but not limited to, monetary awards, to users who generate useful suspicious activity reports. Again, virtual watch application 200 may store this information in a database, such as, but not limited to, user data database 212.

Event triggers module 207 comprises computer executable program code for determining when an event occurs and notifying one or more users of the event. For instance, in one embodiment, event triggers module 207 may determine that an event is occurring when X number of reports and/or emails are received within a few minutes of each other. In other embodiments, event triggers module 207 may determine that an event is occurring when one or more sensors are triggered (e.g., by detecting movement, body heat, etc.). In response to a determination that an event is occurring, event triggers module 207 may retrieve users' registration information and preferences to determine which users to notify and the means for notifying said users. For example, if the detected event is occurring in a particular geographical location, event triggers module 207 may retrieve geographical preferences data to determine which user to notify of the event. Event triggers module 207 then notifies the determined users using one or more of the user specified means for notification (e.g., via email, SMS text, MMS picture, audio messages, and/or video broadcast stream).

Reporting module 208 comprises computer executable program code for generating a report in response to receiving a user-activated request, e.g., a user clicking a report suspicious activity button on the user interface of the web portal. In some embodiments, in response to receiving a user-activated request, reporting module 208 determines the location of the camera associated with suspicious activity report using data stored in camera data database 214. Using the location of the camera, reporting module 208 may determine one or more local law-enforcement agencies associated with the location of the camera from information contained in local law-enforcement agency database 210. Reporting module 208 transmits the suspicious activities report to one or more of the identified local law-enforcement agencies associated with the reporting area. In some embodiments, the generated suspicious activity report may include a timestamp of the date/time of the reported activity report, an identifier of the camera associated with the suspicious activity, and contact information associated with the general public user submitting the suspicious activity report. In addition, in some embodiments, the generated report may include a snippet of the video and/or still images associated with the suspicious activity report.

Load balancing module 209 comprises computer executable program code for monitoring and balancing the network traffic of network environment 100. For instance, in some embodiments, load balancing module 209 may determine the amount of network traffic and reroute the traffic to one or more servers for balancing the network traffic and improving the flow of data. In addition, in some embodiments, load balancing module 209 may disable the capability for a user to select one or more cameras and/or remove one or more links to cameras that are experiencing heavy traffic. For example, in one embodiment, load balancing module 209 may remove a link to a camera if a specified number of users (e.g., 50 users) are logged on and viewing the images from the selected camera. By removing a link to a heavily viewed camera, load balancing module 209 prevents slow down in the network traffic and encourages other users to view other available cameras. In some embodiments, load balancing module 209 may comprise computer executable program code for notifying a user of slow network traffic. For example, in one embodiment, load balancing module 209 may present a pop window that informs a user that there is insufficient bandwidth to present and/or maintain a video feed for a particular camera. The user may then manually switch to a different camera feed.

Further, in some embodiments, load balancing module 209 may include computer executable instructions for automatically selecting a monitored location for a user to maintain/balance network traffic. For instance, in one embodiment, load balancing module 209 may automatically assign a user to a monitored location having the lowest network traffic (i.e., a location with the lowest number of people watching). In other embodiments, load balancing module 209 may automatically assign locations based on a user rating. For instance, users with high ratings (indicating past reliability) may automatically be assigned to a higher priority location. Whereas, users with lower ratings may automatically be assigned to a lower priority location. The priority assigned to each location may be based on one or more factors including, but not limited to, a crime rate associated with a location and/or a loss value associated with a location.

Figure 3:
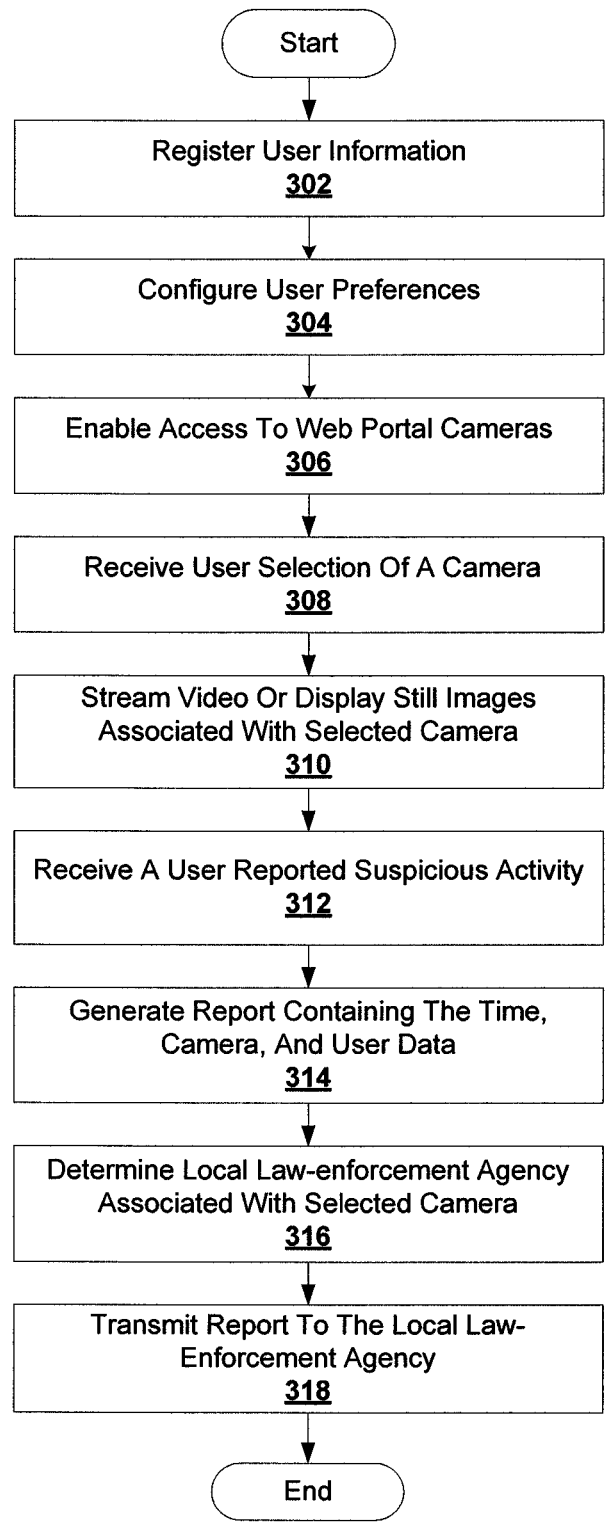
FIG. 3 depicts an embodiment of a process for providing border surveillance in accordance with the illustrative embodiments.

Referring to FIG. 3, an embodiment of a process 300 for monitoring a location is presented in accordance with an illustrative embodiment. One or more data processing systems, such as, but not limited to, servers 102 may execute process 300. Process 300 begins, at step 302, by registering a user to enable the user to gain access to a website to view video/images from surveillance cameras placed about a monitoring location, such as, but not limited to, a border of the United States. In some embodiments, a user must agree to the terms and conditions of the website. For instance, in some embodiments, a user must acknowledge that he/she has read and understands that a user who intentionally generates a false report of suspicious activity may be prosecuted.

In certain embodiments, the process may enable a user to configure one or more user preferences associated with their account at step 304. For example, as described above, in some embodiments, the process may enable a user to configure a notification feature to notify a user of detected and/or potential events associated with one or more of the monitoring devices. In one embodiment, a user may indicate a method and/or format for receiving the notification. Further, in certain embodiments, a user may specify one or more geographical regions of interest.

Following registration and user preferences setup, the process, at step 306, enables the user access to the videos and/or still images from one or more image capturing devices positioned at or along the monitored location. For example, in one embodiment, a user interface that includes a list of cameras is presented to a user. At step 308, the process receives a user selection of one of the cameras. The process, at step 310, streams the video and/or displays the still images associated with the selected camera in a viewing area on the user interface. At step 312, the process receives a report of suspicious activity from a user. At step 314, the process generates a suspicious activity report that includes a timestamp, camera information, and user data information associated with the report of suspicious activity. The process determines the local law enforcement agencies associated with the selected camera at step 316. At step 318, the process transmits the suspicious activity report to the one or more local law enforcement agencies, with process 300 terminating thereafter.

Figure 4:
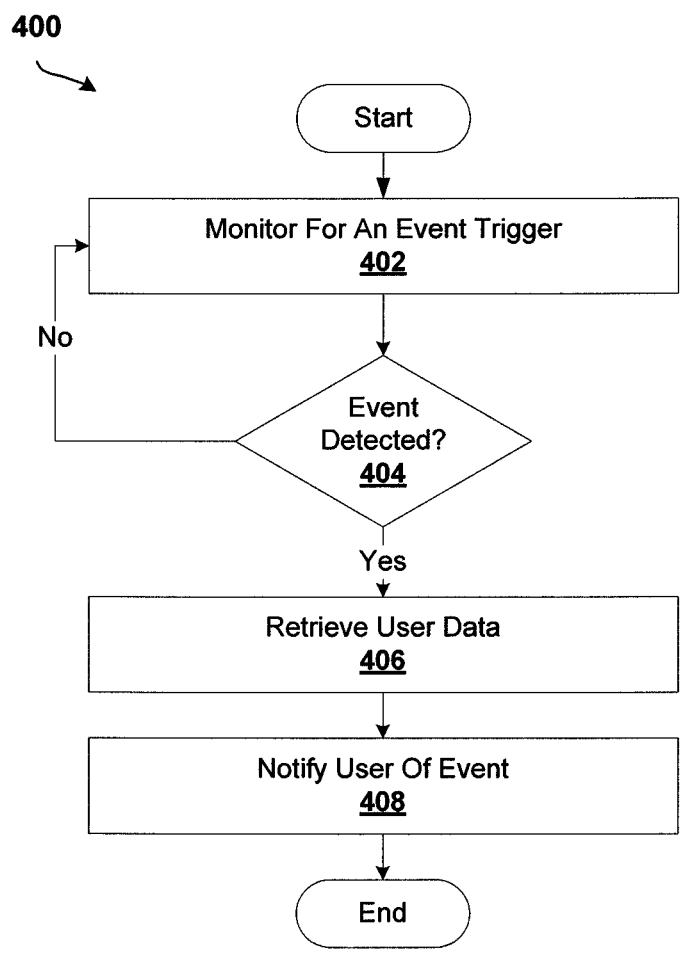
FIG. 4 depicts an embodiment of a process for monitoring and notifying a user of a triggered event in accordance with the illustrative embodiments.

With reference now to FIG. 4, an embodiment of a process 400 is presented for notifying a user of an event occurring at a monitored location. Process 400 monitors for an event trigger at step 402. For instance, in one embodiment, an event trigger may occur when X numbers of suspicious activity reports and/or emails are received within a few minutes of each other (e.g., 3 reports from the same camera within 5 minutes of each other). In other embodiments, an event trigger may occur when one or more sensors are triggered (e.g., by detecting movement, body heat, etc.). If the process detects an event (step 404), the process retrieves user data for determining which users to notify at step 406. For instance, in one embodiment, the process may retrieve information from user database 212 for determining which users to notify (e.g., based on user geographical preference. In addition, the process may retrieve user preferences information for determining the means (e.g., email, SMS, voice message, etc.) for notifying said users. At step 408, the process notifies said users using the determined means, with process 400 terminating thereafter.

Figure 5:
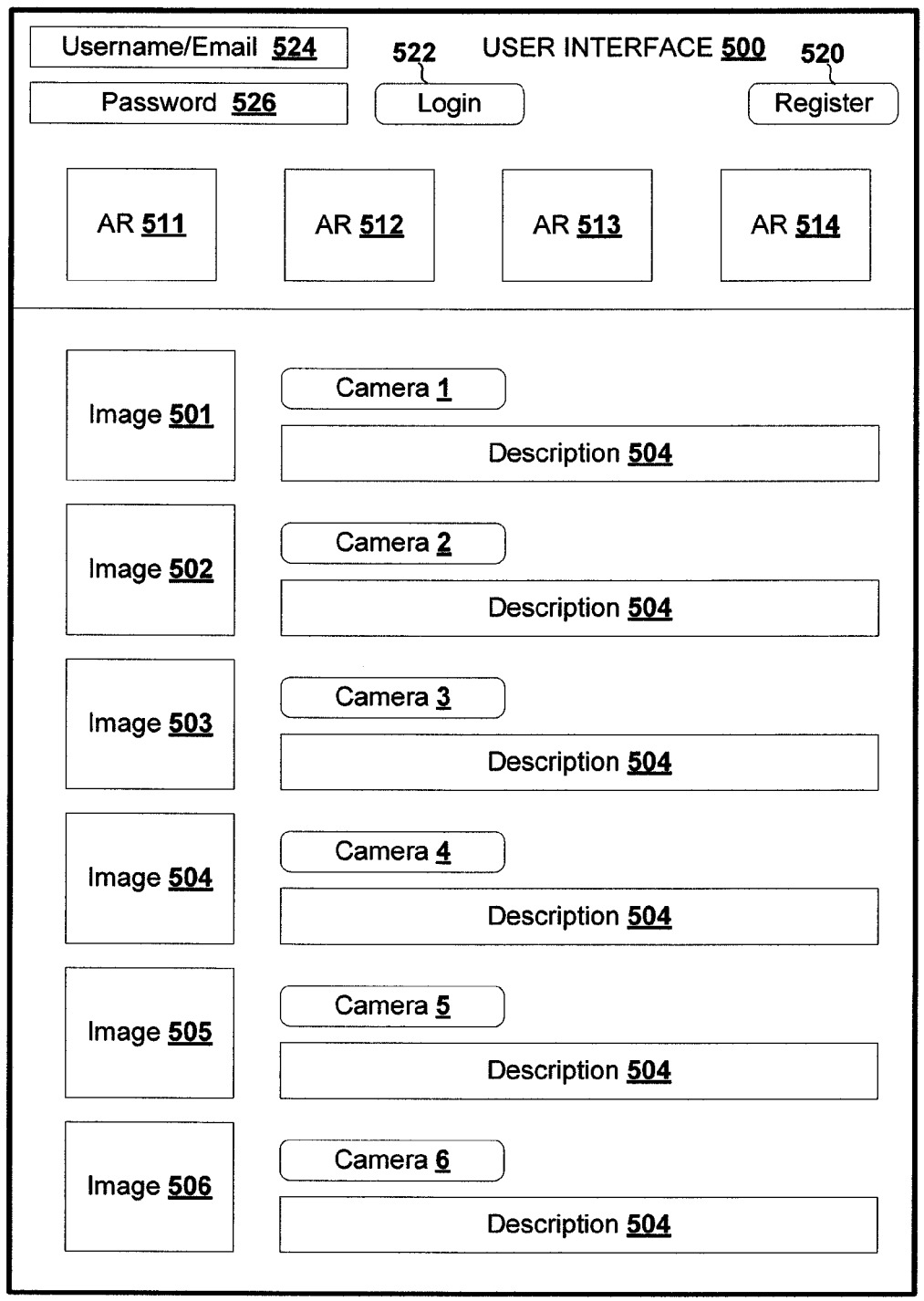
FIG. 5 depicts a user interface for enabling a general public user to view images from a plurality of image capturing devices for monitoring a location in accordance with the illustrative embodiments.

FIG. 5 depicts a user interface 500 for enabling a general public user to view images from a plurality of cameras for monitoring a location in accordance with the illustrative embodiments. In one embodiment, user interface 500 includes a selectable list of cameras that provide images of the monitored location. For example, in the depicted embodiment, the selectable list of cameras comprises Cameras 1-6. However, the disclosed embodiments may be implemented with any number of cameras. Additionally, in some embodiments, the selectable list of cameras may each include a small image associated with each selectable camera (e.g., image 501 associated with Camera 1). In addition, in some embodiments, a description 504 may be provided under each selectable camera for providing some information associated with the location of a particular camera. For example, in certain embodiments, the description 504 may include tips as to what type of suspicious activity to watch for and report.

In certain embodiments, user interface 500 may include one or more links to archived video that contain suspicious activity (depicted as AR 511-514). Alternatively, in some embodiments, user interface 500 may include archived videos on a separate page. Additionally, user interface 500 may include a registration button 520 for registering a new user to view the images associated with the selectable list of cameras and/or a login button 522 for enabling a previously registered user to provide their login information for gaining access to view the images associated with the selectable list of cameras 510. For example, in one embodiment, a user provides a username or email address 524 and password 526 to gain access to user interface 500. In other embodiments, a user may simply provide a previously registered email address 524 to gain access to user interface 500.

Figure 6:
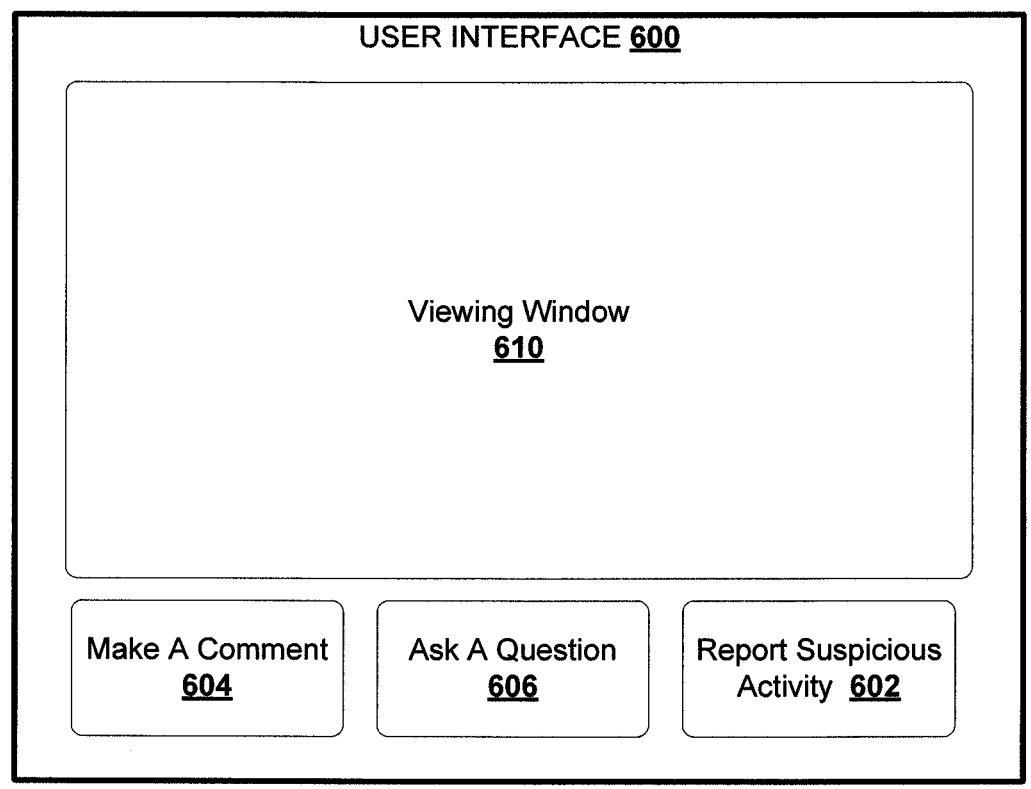
FIG. 6 depicts a user interface for enabling a general public user to view images from an image capturing device and report suspicious activity.

FIG. 6 depicts an embodiment of a user interface 600 for enabling a general public user to view images from a camera and report an activity seen on the camera. For instance, in one embodiment, user interface 600 is presented in response to receiving a user selection of one of the selectable list of cameras depicted in FIG. 5. User interface 600 depicts the images associated with the selected camera in viewing window 610. In the depicted embodiment, user interface 600 includes a report suspicious activity button 602 for enabling a user to report suspicious activity seen in viewing window 610. In some embodiments, in response to receiving a user selection of the report suspicious activity button 602, user interface 600 may present a text box window for enabling a user to provide additional information, such as, but not limited to, information on the suspicious activity. Other embodiments of user interface 600 may include a comment button 604 and/or a questions button 606 for enabling a user to make a general comment and/or ask a question without generating a suspicious activity report. Still, in some embodiments, user interface 600 may include other buttons, including, but not limited to, a chat group button (not depicted) for enabling a user to join a virtual stakeout team.

Figure 7:
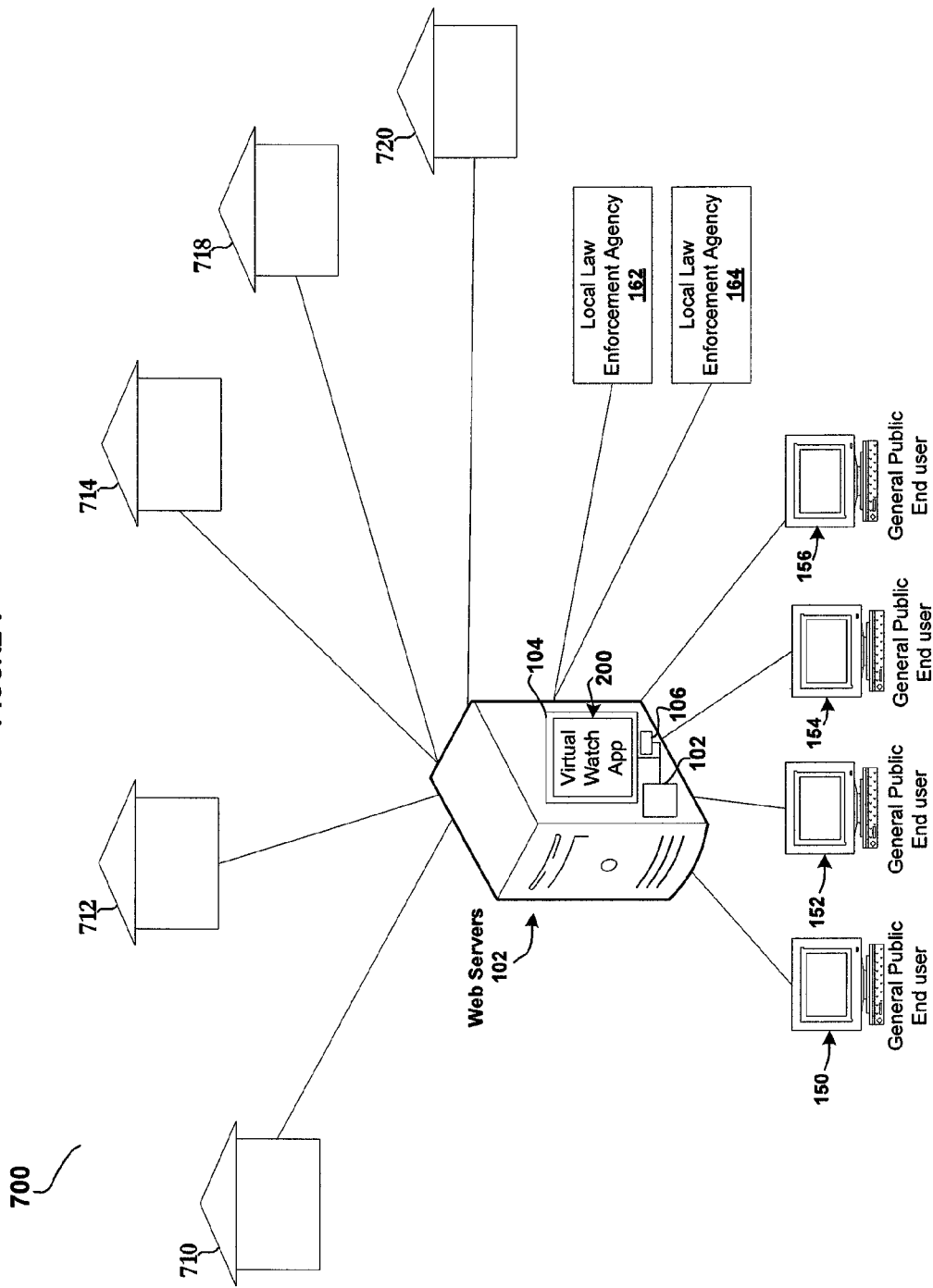
FIG. 7 depicts a network environment in which the virtual watch application of FIG. 2 may be utilized to monitor a plurality of residential locations in accordance with an illustrative embodiment.

Although, FIG. 1 depicts monitoring a border location, the disclosed embodiments may be utilized to monitor any location including, but not limited to, a residential location, a school campus, a public/mass transportation facility, and/or a business location. As an example, in certain embodiments, the disclosed embodiments may be utilized in a home health care environment to monitor the elderly and/or to provide home security for one or more residential locations. For instance, FIG. 7 depicts a network environment 700 in which virtual watch application 200 may be utilized to monitor a plurality of residential locations such as, but not limited to, residential locations 710, 712, 714, 716, 718, and 720. In one embodiment, an owner of a residential location may sign on for temporary monitoring services while away on vacation or on business. This enables the owner of a residential location to have temporary security monitoring service on an as needed basis without having to enter into a long-term contract with a private security monitoring company. One or more cameras may be installed at the location to provide for security monitoring. In some embodiments, the cameras may simply be one or more web cameras that are connected to a user's home computer and provides images of the location. Virtual watch application 200 receives and provides these images to one or more general public users. In these embodiments, the actual location of a monitored location is anonymous and not disclosed to the general public users. As will be further described, in one embodiment, the general public users may receive a financial incentive and/or other rewards for monitoring these locations.

Still, in some embodiments, virtual watch application 200 may monitor one or more locations without user interaction. For instance, in one embodiment, virtual watch application 200 may include computer executable instructions to automatically detect an intruder at a monitored location using image recognition and/or by receiving a signal from one or more sensors placed at the monitored location (e.g., a motion sensor). In some embodiments, in response to detecting an intruder, virtual watch application 200 may notify a particular person of the alert for enabling the person to verify the alert. In other embodiments, virtual watch application 200 may automatically notify a local law enforcement agency of the detected intrusion.

Further, in some embodiments, virtual watch application 200 may be utilized to monitor an elderly person with or without user interaction (i.e., without a general public user watching the location). For instance, in certain embodiments, virtual watch application 200 may include computer executable instructions for dynamically detecting a position of a person to determine whether a person has fallen down. For example, in certain embodiments, virtual watch application 200 may utilize image recognition for identifying whether a person is in a vertical state (e.g., standing or sitting) and/or in a non-vertical state (e.g., laying/fallen down). For instance, using image recognition, if a vertical length of a person is longer than a horizontal length, then virtual watch application 200 may determine that the person is in a vertical state. In one embodiment, if the person goes from a vertical state to a non-vertical state, virtual watch application 200 may calculate the velocity by which the person goes from the vertical state to a non-vertical state. If the velocity is above a predetermined threshold, virtual watch application 200 may determine that the person has fallen down. In other embodiments, virtual watch application 200 may also determine an exact location of the person within a monitored location by identifying the location of a particular camera. For example, if virtual watch application 200 determines that the camera that was monitoring the person is monitoring the kitchen area, then virtual watch application 200 may automatically determine that a person has fallen down if they are in a non-vertical state in the kitchen. In other embodiments, virtual watch application 200 may determine location of the person within a monitored location by using image recognition to identify an object in the area. For example, in one embodiment, if virtual watch application 200 identifies a refrigerator in the area, then virtual watch application 200 may determine that the person has fallen. Whereas, if virtual watch application 200 identifies a bed, then virtual watch application 200 may determine that the person is simply laying down. In some embodiments, in response to detecting a fall, virtual watch application 200 may notify a particular person of the alert for enabling the person to verify the situation.

In another example, the disclose embodiments may enable the general public to assist in monitoring a mass transportation facility (e.g., a train/subway station, an airport, etc.), a warehouse, a shipping yard, and/or any other location for suspicious activity. For instance, FIG. 8 depicts a network environment 800 in which virtual watch application 200 may be utilized to monitor a shipping yard 810. Shipping yard 810 may contain a plurality of shipping containers that contain items that are imported and exported to other locations. In one embodiment, virtual watch application 200 may divide shipping yard 810 into a plurality of monitored areas 810A-810R. One or more image capturing devices may monitor each of the monitored areas. For example, in the depicted embodiment, image capturing devices 810A-1-810A-4 are utilized to monitor monitoring area 810A. In certain embodiments, a general public is incentivized to monitor one or more image capturing devices and/or one or more monitored areas of shipping yard 810. In a preferred embodiment, the monitored area is anonymous to the general public user. In one embodiment, in response to receiving a user report of suspicious activity, virtual watch application 200 identifies the image-capturing device associated with the report of suspicious activity and determines the location of the identified image-capturing device within shipping yard 810. In one embodiment, virtual watch application 200 may generate a suspicious activity report that includes, but is not limited to, the location of the identified image capturing device within shipping yard 810, the time of the general public user reported the incident, and an identifier that identified the general public user that reported the incident. The report may be transmitted a local law enforcement agency and/or to a security team associated with shipping yard 810.

Figure 9:
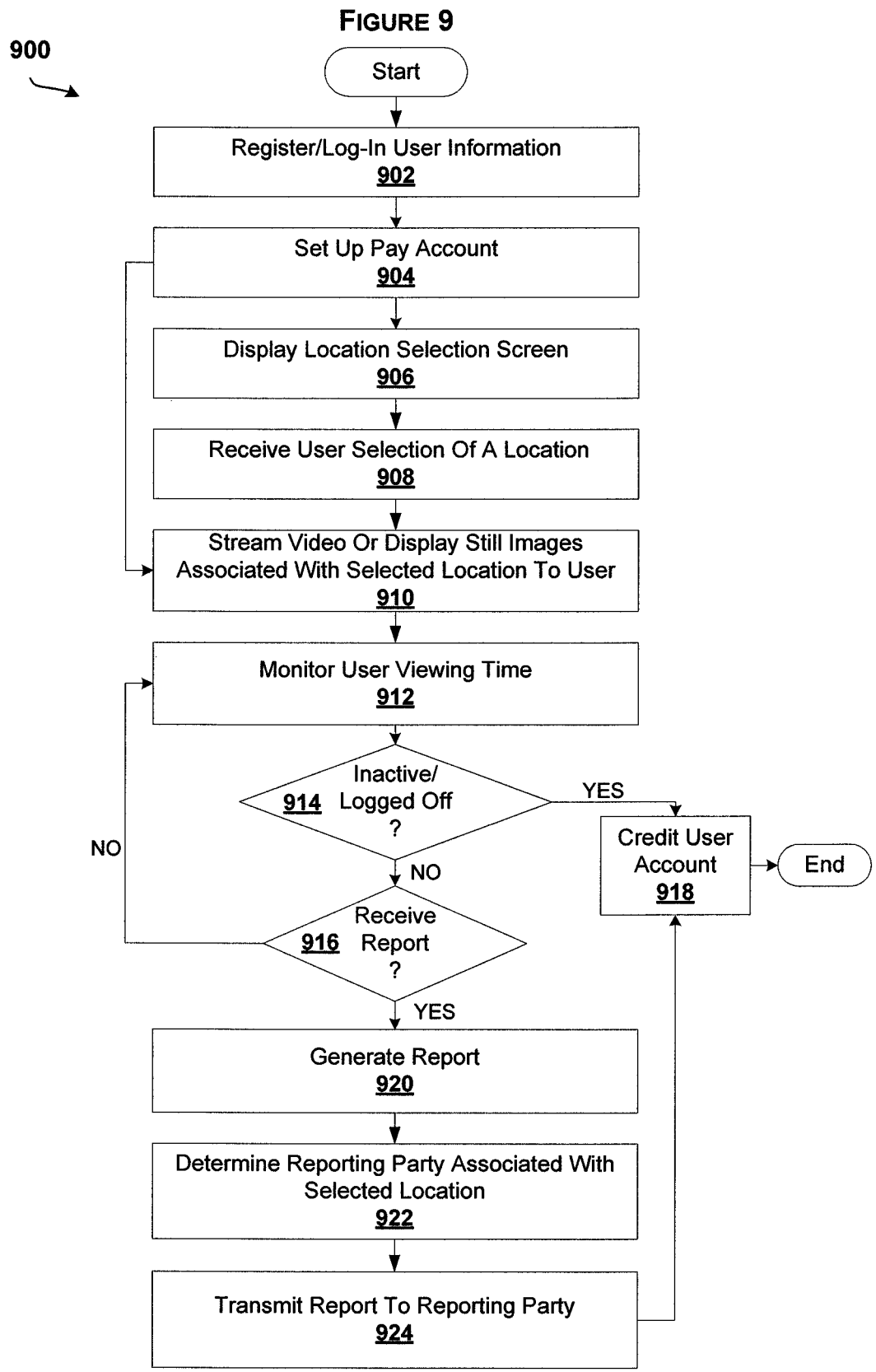
FIG. 9 depicts an embodiment of a process for incentivizing a general public user to monitor a location in accordance with the illustrative embodiments.

With reference to now to FIG. 9, an embodiment of a process 900 for incentivizing a general public user to monitor a location is presented in accordance with the illustrative embodiments. In the depicted embodiment, process 900 begins by registering a general public user and/or logging a previously registered general public user at step 902. In some embodiments, at step 904, if the user has not done so, the process enables the user to set up a pay account. The pay account is utilized to credit/pay the general public user for monitoring a location. In some embodiments, the user may utilize a third party pay system (e.g., PayPal®) to receive payments for monitoring a location. Alternatively and/or in addition to, in other embodiments, a general public user may receive other benefits for monitoring a location, such as, but not limited to, receiving reward points that may be utilized to purchase one or more items.

Figure 11:
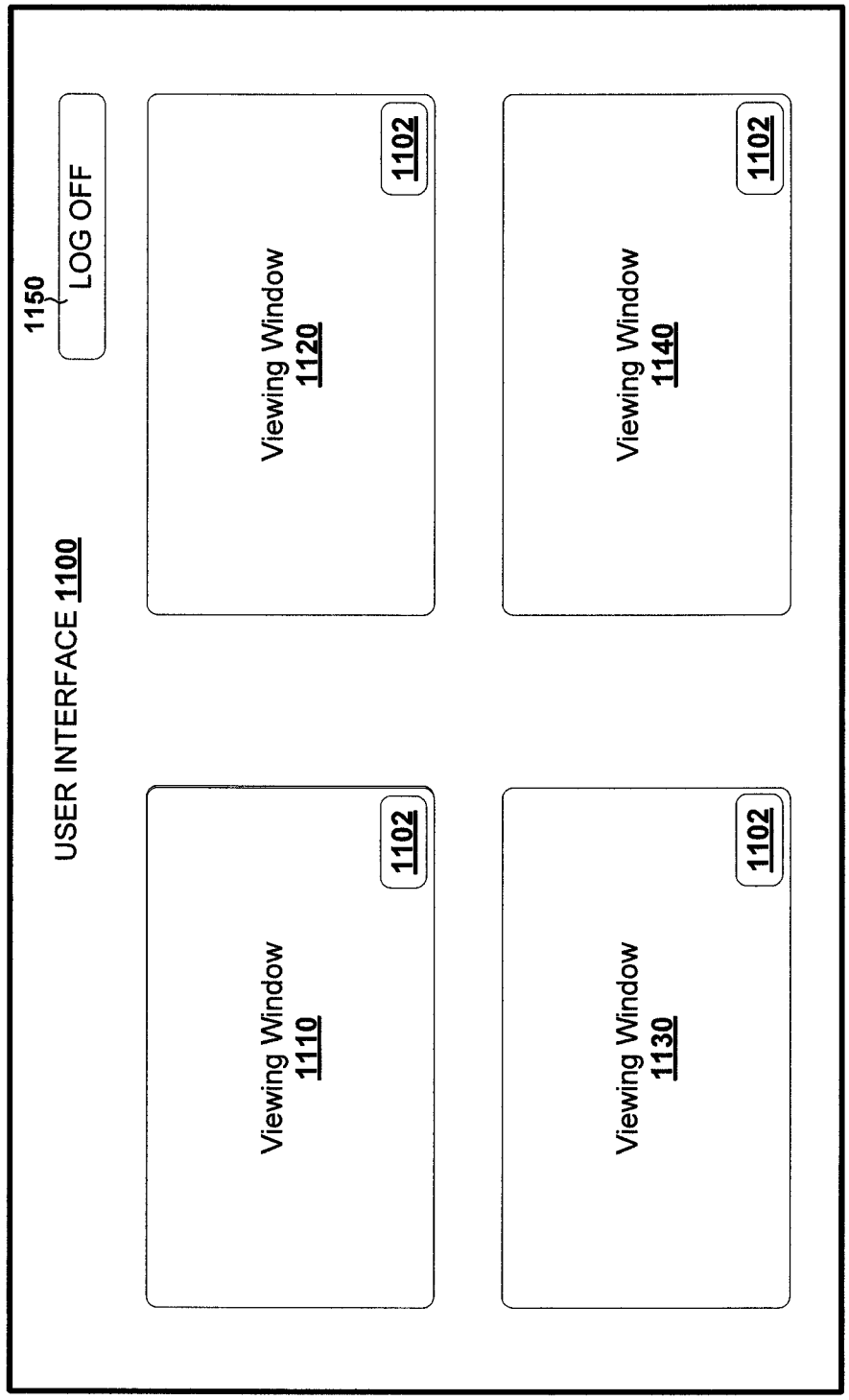
FIG. 11 depicts an embodiment of a user interface for displaying images to a general public user in accordance with the illustrative embodiments.

In certain embodiments, the process, at step 906, may display a selection screen, as will be described in FIG. 10, for enabling a general public user to select one or more locations for monitoring. At step 908, the process receives the user-selection choices of the monitored locations. The process transmits the images from the selected location(s) to the general public user at step 910. Alternatively, as will be further described, in some embodiments, process 900 may automatically select a location for a general public user to monitor. In some embodiments, a general public user may monitor one or more cameras at the same location and/or one or more cameras from different locations as illustrated in FIG. 11.

In one embodiment, the process, at step 912, logs the amount of time a general public user monitors a location. At step 914, the process determines whether a user is inactive and/or has logged off the system. In one embodiment, if the process determines that a general public user is inactive and/or has logged off the system, the process, at step 918, credits the user's pay account for the time spent monitoring the location. At step 916, the process monitors for a report of suspicious activity. If the process receives a report of suspicious activity from a general public user, the process generates a suspicious activity report at step 920. In certain embodiments, in response to receiving a report of suspicious activity from a general public user, the process may identify an image-capturing device associated with the report of suspicious activity. The process may also determine the specific location of the identified image-capturing device. The specific location may be a physical address and/or may be a specific monitoring area within a monitored location. The specific location may be included in the generated suspicious activity report. In addition, the process may include, but is not limited to, a timestamp (date/time) of the reported incident and information identifying the general public user that reported the suspicious activity.

In one embodiment, the process, at step 922, may determine an appropriate reporting party associated with the monitored location. For instance, in some embodiments, the appropriate reporting party may be a private security company, a business owner, a residential owner, and/or local law enforcement agency. The process transmits the generated suspicious activity report to the appropriate reporting party at step 924. In some embodiments, the process may notify the appropriate reporting party via other means, such as, but not limited to, SMS text message, email, and/or via a telephone call. In one embodiment, the process, at step 918, may credit the general public user's pay account a predetermined amount for reporting the suspicious activity, with process 900 terminating thereafter.

FIG. 10 depicts an embodiment of a user selection screen 1000 for enabling a general public user to select a location for monitoring in accordance with the illustrative embodiments. In one embodiment, a general public user may select multiple locations for monitoring via user selection screen 1000. In the depicted embodiment, user selection screen 1000 includes a plurality of locations that are available to a general public user to monitor. In one embodiment, a name 1002 of a company/business may be displayed for each monitored location. In some embodiments, name 1002 may be a real business name identifying a particular company. In other embodiments, name 1002 may be a pseudo-name that identifies a particular business. In one embodiment, the pseudo-name remains consistent to a particular company to enable a general public user the choice of monitoring the same company and for billing the company for the monitoring services.

In addition to the name 1002, in some embodiments, user selection screen 1000 may include payment terms 1004 associated with each company. In one embodiment, payment terms 1004 may be text displayed on user selection screen 1000 that discloses the payment terms. In other embodiments, payment terms 1004 may display the payment terms in a pop up window in response to a user hovering a mouse pointer over the screen area of payment terms 1004. In some embodiments, the general public user may print the payment terms associated with location. Examples of payment terms may include, but is not limited to, "X amount per minute(s)" 0 (e.g., 5 cents per minute), "X amount per report of suspicious activity" (e.g., $50 per report of suspicious activity), "X amount for recovery and/or arrest stemming from a report of suspicious activity", and/or any combination thereof. In one embodiment, the provider of virtual watch application 200 collects this amount, in addition to other service fees, from the selected company and/or residential owner.

In some embodiments, user selection screen 1000 may include a preview image window 1006 for enabling a general public user to view an image of a monitored location. In some embodiments, preview image window 1006 may contain a still image and/or live images from an image-capturing device located at the particular location.

FIG. 11 depicts an embodiment of a user interface 1100 that is display on a general public user's computing/display device. In the depicted embodiment, user interface 1100 enables a general public user to view images from four different image-capturing devices in viewing window 1110, viewing window 1120, viewing window 1130, and viewing window 1140. In other embodiments, user interface 1100 may include more or less viewing windows than depicted. Viewing window 1110, viewing window 1120, viewing window 1130, and viewing window 1140 may receive images from image-capturing devices located at the same monitoring location (i.e., different monitoring areas and/or different angles) and/or may receive images from image-capturing devices located at one or more different monitoring locations. In one embodiment, each viewing window includes a report suspicious activity button 1102 for enabling the general public user to report suspicious activity. Report suspicious activity button 1102 is tied to a particular viewing window for enabling virtual watch application 200 to identify a particular camera associated with a viewing window in response to receiving a report of suspicious activity. In certain embodiments, user interface 1100 may include a log off button 1150 for enabling a general public user to terminate a monitoring session. Alternatively, in some embodiments, the user may simply close a browser window, terminate network connection, and/or turn off his computing device to terminate a monitoring session.

Figure 12:
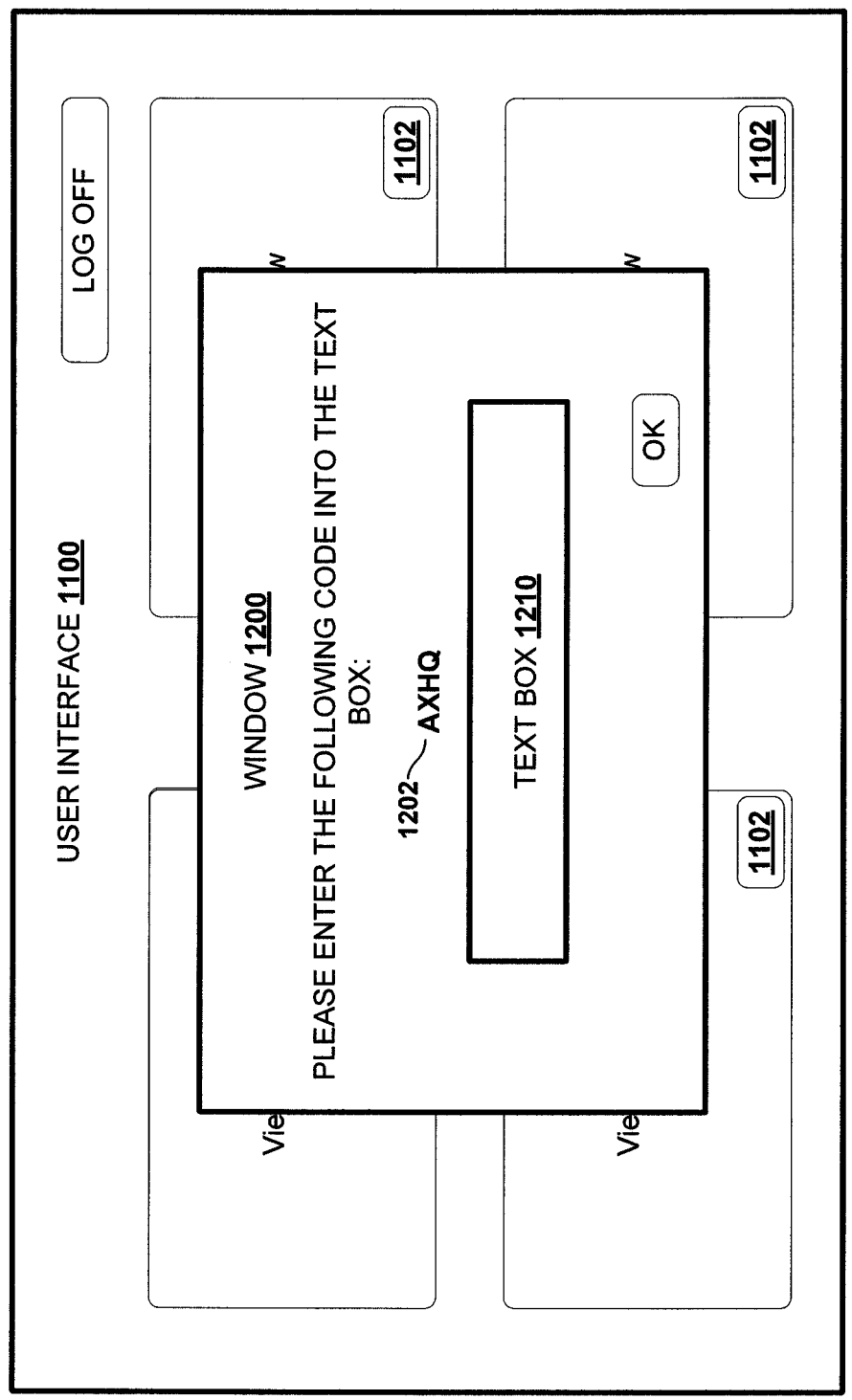
FIG. 12 depicts an embodiment of a user interface that may be utilized to detect inactivity in accordance with the illustrative embodiments.

FIG. 12 depicts an example embodiment of a window 1200 that may be utilized to monitor inactivity in accordance with the illustrative embodiments. For instance, in one embodiment, window 1200 is periodically displayed at predetermined intervals and/or at random times for ensuring that a general public user is viewing the images of a monitored location. In certain embodiments, to ensure that a user is present, window 1200 may display a randomly generated code 1202. A general public user must enter the randomly generated code 1202 into a text box 1210 within a predetermined time. In one embodiment, if virtual watch application 200 does not receive the randomly generated code 1202 within the predetermined time, the user is logged off for inactivity. In some embodiments, for payment purposes, virtual watch application 200 subtracts from the user's monitored time an amount of time since the last generated code 1202 was received from the user. In addition, in some embodiments, a user's rating may decrease based on the number of times a user is determined to be inactive. In some embodiments, general public users with higher ratings are paid a higher amount than users with lower ratings. In addition, in some embodiments, users with lower ratings may be banned from the system.

Figure 13:
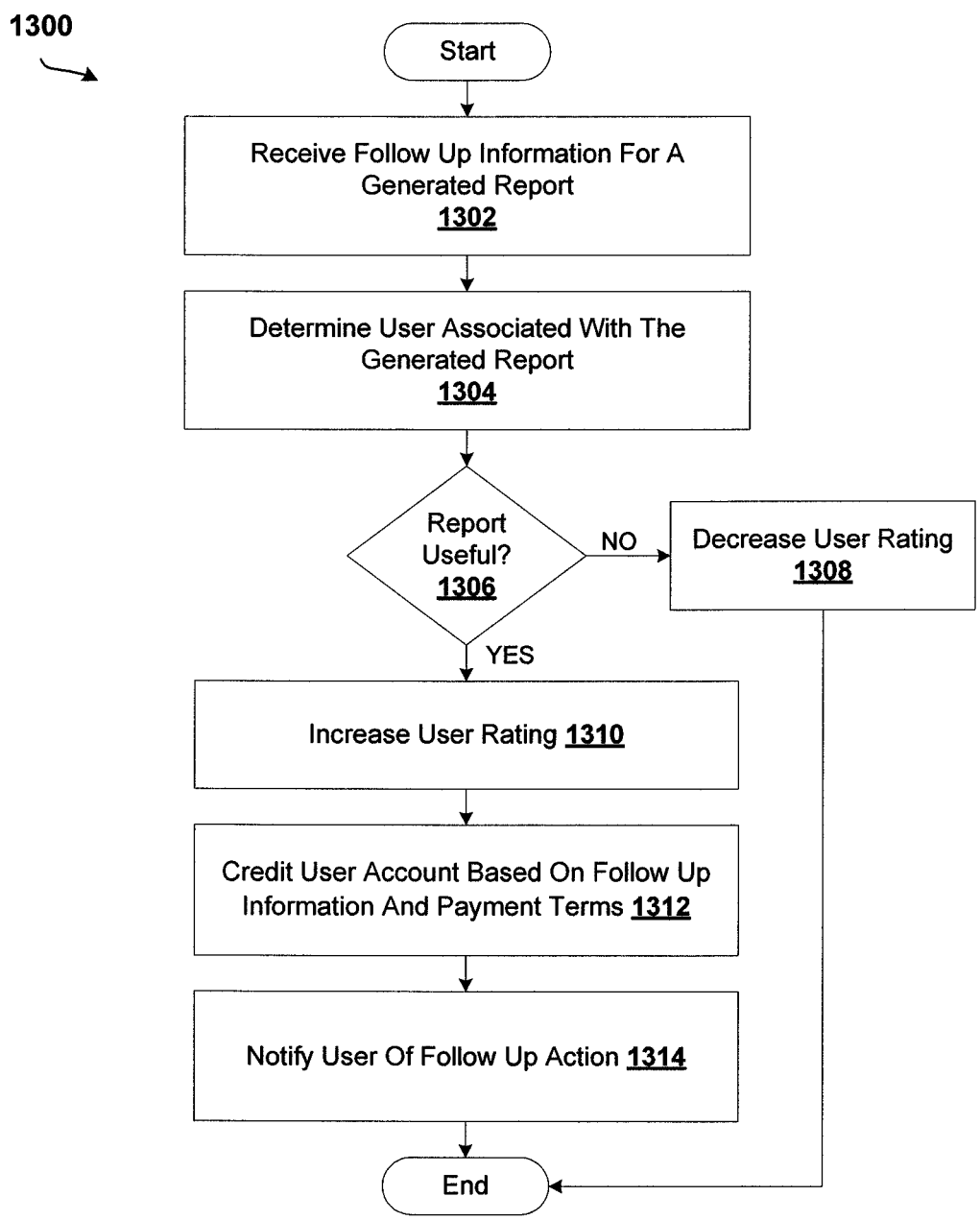
FIG. 13 depicts an embodiment of a process for receiving follow up information pertaining to a suspicious activity report in accordance with the illustrative embodiments.

FIG. 13 depicts an embodiment of a process 1300 for receiving follow up information pertaining to a suspicious activity report in accordance with the illustrative embodiments. For instance, in one embodiment, process 1300 receives, at step 1302, follow up information, such as, but not limited to, whether a suspicious activity report was valid (i.e., not a false report), whether an arrest was made, and/or whether goods were recovered. At step 1304, the process determines a general public user that generated the suspicious activity report. The process, at step 1306, determines based on the follow up information whether the suspicious activity report was beneficial. If the suspicious activity report was not beneficial (a false report), the process at step 1308 may decrease the general public user's rating, with process 1300 terminating thereafter. If the suspicious activity report was beneficial, the process at step 1310 may increase the general public user's rating. In addition, in some embodiments, the process may credit the user's pay account based on the follow up information and/or payment terms. For example, in some embodiments, the general public user may receive a fixed amount for every suspicious activity report that results in an arrest or a recovery of goods. In other embodiments, the general public user may receive a fixed amount for generating a valid report. Still, in some embodiments, the general public user may receive a percentage of the amount of recovered goods.

In some embodiments, the process, at step 1314, may notify the user of the follow up information relating to his suspicious activity report, with process 1300 terminating thereafter. In addition, in some embodiments, the process may also notify the user of a credit to his payment account and/or an increase/decrease in his user rating.

Figure 14:
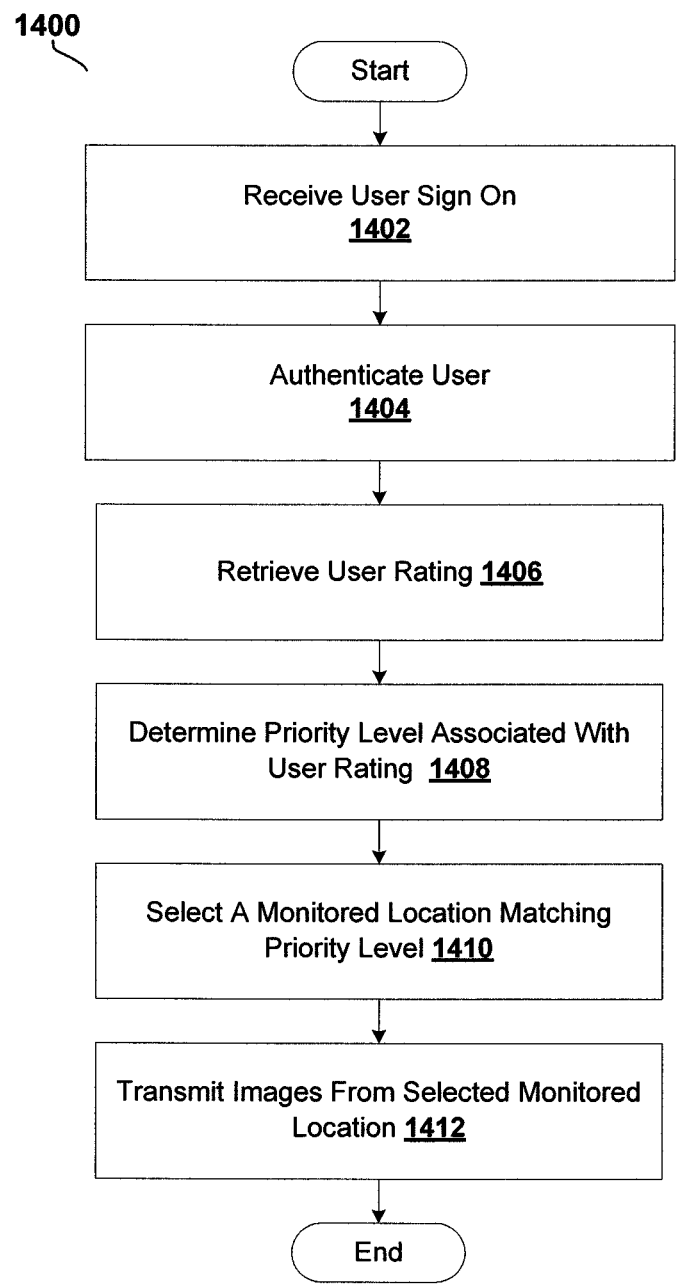
FIG. 14 depicts an embodiment of a process for assigning a monitored location based on a user rating in accordance with the illustrative embodiments.

FIG. 14 depicts an embodiment of a process 1400 for assigning a monitored location based on user rating in accordance with the illustrative embodiments. Process 1400 enables virtual watch application 200 to assign monitored locations based on priority levels. For example, general public user's with higher ratings are assigned to monitor locations that have a higher priority rating. As stated above, a locations priority may be determined based on one or more factors including, but not limited to, a crime rate associated with a location and/or a loss value associated with a location. Process 1400 may also be utilized to evenly distribute/assign monitored locations, thereby, helping to balance the network traffic.

Process 1400 begins, at step 1402, by receiving a general public user's sign on information. The process authenticates the user's sign on information at step 1404. The process retrieves the general public user's assigned rating at step 1406. The process, at step 1408, determines a priority level associated with the user's assigned rating based on the user's assigned rating. At step 1410, the process selects a monitored location having the determined priority level. The process transmits images from one or more image capturing devices associated with the selected monitored location to the general public user at step 1412, with process 1400 terminating thereafter.

Figure 15:
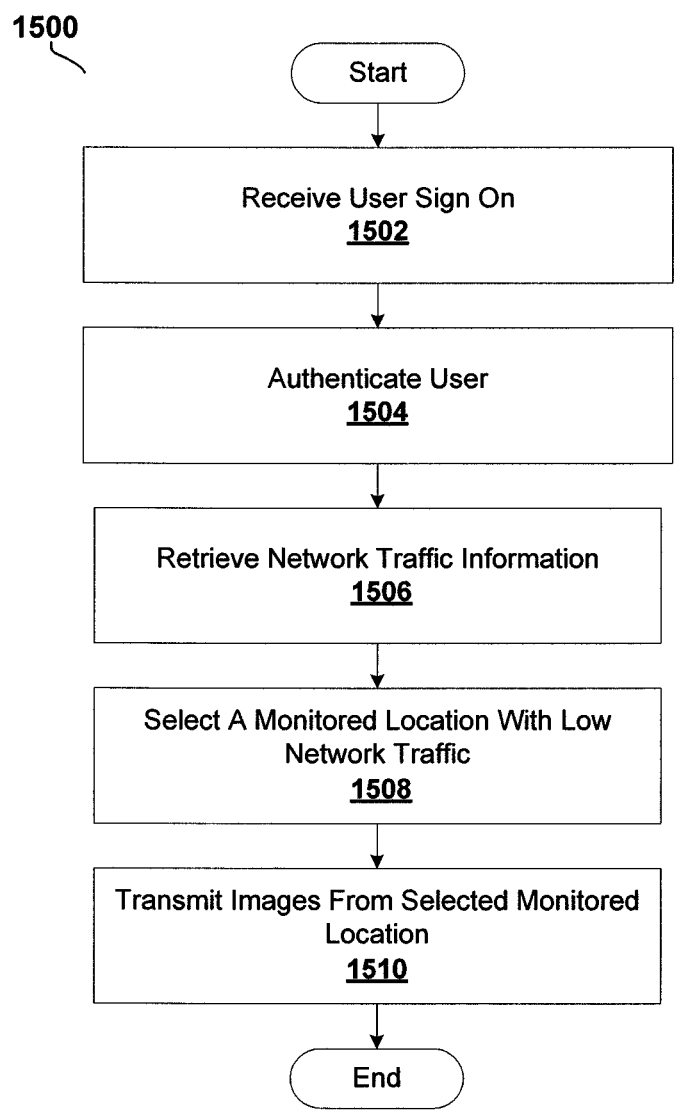
FIG. 15 depicts an embodiment of a process for balancing network traffic in accordance with the illustrative embodiments.

FIG. 15 depicts an embodiment of a process 1500 for balancing network traffic in accordance with the illustrative embodiments. Process 1500 receives a general public user's sign on information at step 1502. The process authenticates the user's sign on information at step 1504. The process retrieves network traffic information at step 1506. The process selects one or more monitored locations and/or image capturing devices having low network traffic at step 1508. The process transmits images from the selected one or more monitored locations and/or image capturing devices to the general public user at step 1510, with process 1500 terminating thereafter.

Accordingly, embodiments of the disclosed invention include a system and a method for monitoring a location using general public users as virtual deputies. For example, in one embodiment, the disclosed embodiments may be utilized to assist law enforcement in monitoring a border of the United States. In certain embodiments, a user interface (e.g., a web portal) is provided in which the general public may view streaming video and/or still images associated with image capturing devices (e.g., video cameras) placed along the monitored location. A user viewing one or more selected cameras is provided with an option on the user interface to report suspicious activities seen on the one or more selected image capturing devices. The suspicious activity report may be sent to one or more local law enforcement agencies associated with the location of the camera.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method for monitoring a location, the method comprising:
    recording images at the location using a plurality of video cameras;
    providing a user interface for enabling a general public user to view the images over a network, the general public user including a plurality of general public users;
    balancing the plurality of general public users viewing the images of a first video camera of the plurality of video cameras and a second video camera of the plurality video cameras with a load balancing module, in balancing the general public viewers including:
        providing a link for each video camera of the plurality of video cameras; and
        removing a link to a video camera of the plurality of video cameras having a predetermined number of general public users viewing the images of the video camera;
    providing a report suspicious activity option on the user interface for enabling the general public user to report suspicious activity seen at the location; and
    responsive to receiving a user report of suspicious activity, generating a report of suspicious activity for the location.

2. The method of claim 1, further comprising: determining a local law enforcement agency associated with the location; and transmitting the generated report of suspicious activity to the local law enforcement agency.

3. The method of claim 1, further comprising requiring the general public user to provide contact information prior to enabling the general public user to view the images over the network.

4. The method of claim 1, further comprising requiring the general public user to provide contact information when submitting the user report of suspicious activity.

5. The method of claim 1, wherein the location is a border between a first country and a second country.

6. The method of claim 5, further comprising:
    recording images along the border using a plurality of video cameras, wherein each of the plurality of video cameras is associated with a particular area of the border; and
    responsive to receiving the user report of suspicious activity via the report suspicious activity option on the user interface, generating the report of suspicious activity that includes identifying the particular area of the border; and transmitting the generated report of suspicious activity to a local law enforcement agency associated with the particular area of the border.

7. The method of claim 1, wherein the location is a public transportation facility.

8. The method of claim 1, further comprising: detecting an event occurring at the location using at least one sensor device; and responsive to detecting the event, transmitting a message to the general public user to notify the general public user of the detected event.

9. The method of claim 1, further comprising:
    determining whether an event is occurring at the location based on whether a plurality of user reports of suspicious activity is received within a predetermined time frame; and
    responsive to determining that the event is occurring, transmitting a message to a plurality of general public users to notify the plurality of general public users of the event.

10. The method of claim 9, further comprising determining the plurality of general public users based on a geographical preference setting.

11. The method of claim 1, further comprising: enabling a plurality of general public users to communicate to one another over the network regarding the images seen at the location.

12. The method of claim 1, further comprising: creating a rating system to rate the general public user's reliability based on past reported suspicious activities.

13. The method of claim 1, wherein the general public user further comprises an unrestricted general public user.

14. The method of claim 1, wherein the location is unknown to the general public user.

15. The method of claim 14, wherein the location is known to the non-general public user.

16. The method of claim 15, wherein the non-general public user is government law enforcement.

17. The method of claim 1, wherein the location comprises a plurality of locations that are unknown to the general public user, the method further comprising relating the plurality of locations that are unknown to the general public user to a plurality of locations known to the non-general public user.

18. The method of claim 1, wherein balancing the plurality of general public users comprises assigning a general public user of the plurality of general public users to a video camera of the plurality of video cameras having a lowest network traffic of the plurality of video cameras.

19. The method of claim 1, further comprising providing a payment terms option for enabling the general public user to see payment terms associated with each video camera of the plurality of video cameras.

20. The method of claim 1, wherein the location comprises a plurality of locations, the method further comprising assigning the general public user to view images of a location of the plurality of locations based on a rating of the general public user and a priority of the location of the plurality of locations.

21. A method for monitoring a location, the method comprising:
   recording images at the location using a plurality of video cameras;
   providing a user interface for enabling a user to view the images over a network, the general public user including a plurality of general public users;
   balancing the plurality of general public users viewing the images of a first video camera of the plurality of video cameras and a second video camera of the plurality video cameras with a load balancing module, in balancing the general public viewers including:
      providing a link for each video camera of the plurality of video cameras; and
      removing a link to a video camera of the plurality of video cameras having a predetermined number of f general public users viewing the images of the video camera;
   providing a report activity option on the user interface for enabling the user to report activity seen at the location; and
   responsive to receiving a user report of activity via the report activity option on the user interface, transmitting a report of activity for the location to a local law enforcement agency associated with the location.

22. The method of claim 21, wherein the location is a residential location and the user is a resident of the location.

23. The method of claim 21, further comprising:
   detecting an event occurring at the location using at least one sensor device; and
   responsive to detecting the event, transmitting a message to the user to notify the user of the detected event.

24. The method of claim 21, further comprising:
   using image recognition for identifying a person at the location;
   monitoring the person to determine whether the person has is in a non-vertical state; and
   responsive to a determination that the person is the non-vertical state, transmitting a message to the user to notify the user that the person is in the non-vertical state.

25. A system for border surveillance and control, the system comprising:
   a plurality of video cameras, wherein each video camera is associated with a particular portion of a border; and
   a network server in communication with the plurality video cameras, the server operable to host streams of images received from the video cameras, the network server in communication with one or more client systems and being configured
   (a) to enable a plurality of general public users to view, on a user interface, the images received from the video cameras wherein report a suspicious activity option on the user interface is provided for enabling the general public user to report a suspicious activity seen at the border; and
   (b) to balance the plurality of general public users viewing the images of a first video camera of the plurality of video cameras and a second video camera of the plurality video cameras with a load balancing module, in balancing the general public viewers, the network server further being configured (i) to provide a link for each video camera of the plurality of video cameras; and (ii) to remove a link to a video camera of the plurality of video cameras having a predetermined number of general public users viewing the images of the video camera, the network server further being configured to receive an indication of an alert from the one or more clients systems, the alert being associated with the images received from one of the video cameras, the indication including a first identifier identifying a camera associated with the alert and a second identifier associated with a user that generated the alert; and
   the network server operable to generate a border activity message to one of a plurality of law enforcement contacts, the one of a plurality of law enforcement contacts selected in response to the first identifier.

26. The system for border surveillance and control of claim 25, further comprising the indication including a third identifier that provides a time stamp of the alert.

27. The system for border surveillance and control of claim 25, further comprising:
   a plurality of sensors located along the border for detecting the presence of an individual, the plurality of sensors in communication with the network server; and
   the network server operable to receive a detection alert from one of the plurality of sensors, identify a video camera associated with the one of the plurality of sensors, and transmit a message to alert one or more general public users to view the video camera associated with the one of the plurality of sensors.

* * * * *